United States Patent Office 3,209,004
Patented Sept. 28, 1965

3,209,004
3,6-DIAMINO-N-(2,2-DIALKOXYETHYL)PYRIDO [2,3-b]PYRAZINE-2-CARBOXAMIDES
Arthur A. Santilli, Ardmore, and Thomas S. Osdene, Berwyn, Pa., assignors to American Home Products Corporation, New York, N.Y., a corporation of Delaware
No Drawing. Filed May 17, 1963, Ser. No. 281,338
2 Claims. (Cl. 260—250)

This invention relates to novel pyrido[2,3-b]pyrazine-2-carboxamide compounds possessing useful pharmacological properties. More particularly, the invention is concerned with compounds having a 3,6-diamino-pyrido [2,3-b]pyrazine-2-carboxamide nucleus having a 2,2-dialkoxyethyl radical on the nitrogen atom of the carboxamido group.

Preferred compounds in accord with this invention are represented by the following general formula:

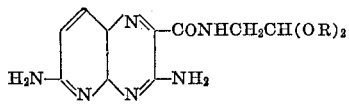

wherein R represents a lower alkyl group having up to 5 carbon atoms.

The compounds of this invention are prepared by reacting in anhydrous alcohol (ethanol, methanol or 2-ethoxy-ethanol), preferably in the presence of a catalytic amount of a basic catalyst such as sodium, stoichiometric amounts of a 2-cyano-N-(2,2-dialkoxyethyl)acetamide and of 2,6-diamino-3-nitrosopyridine. The reaction mixture is refluxed until completion of the reaction and allowed to cool to room temperature. The desired product is purified by recrystalliaztion from ethanol.

The following examples illustrate the practice of the invention:

EXAMPLE 1

*3,6-diamino-N-(2,2-diethoxyethyl)pyride [2,3-b]pyrazine-2-carboxamide*

To a stirred solution of 0.92 g. of sodium metal in 100 ml. of absolute ethanol was added 5.5 g. of 2,6-diamino-3-nitrosopyridine followed by a 8.6 g. of 2-cyano-N-(2,2-diethoxyethyl)acetamide. The reaction mixture was heated under reflux for 2 hrs. and was allowed to stand overnight at room temperature. The crystals which had deposited amounted to 8.3 g., M.P. 229–230°. Recrystallization from ethanol afforded 3,6-diamino-N-(2,2-diethoxyethyl)pyrido[2,3-b]pyrazine - 2-carboxamide, M.P. 230–231°.

Calculated: C=52.49; H=6.29; N=26.24. Found: C=52.43; H=6.23; N=26.53.

EXAMPLE 2

*3,6-diamino-N-(2,2-dimethoxyethyl)pyrido [2,3-b]pyrazine-2-carboxamide*

Reaction of 5.5 g. of 2,6-diamino-3-nitrosopyridine with 7.4 g. of 2-cyano-N-(2,2-dimethoxyethyl) acetamide as in Example 1 affords 3,6-diamino-N-(2,2-dimethoxyethyl) pyrido[2,3-b]pyrazine-2-carboxamide.

Reaction as in Example 1 of 2,6-diamino-3-nitrosopyridine with 2-cyano-N-(2,2-dipropoxyethyl) acetamided, 2-cyano-N-(2,2-dibutoxyethyl)acetamide and 2-cyano-N-(2, 2-dipentyloxyethyl)acetamide, respectively, yields: 3,6-diamino-N-(2,2-dipropoxyethyl)pyridol[2,3-b]pyrazine-2-carboxamide; 3,6-diamino - N-(2,2-dibutoxyethyl) pyrido [2,3-b]pyrazine-2-carboxamide and 3,6-diamino-N-(2,2-dipentyloxyethyl) pyrido [2,3-b]pyrazine-2-carboxamide.

When tested pharmacologically, the compounds of this invention exhibited diuretic, anti-inflammatory and antiviral activities.

All the compounds of this invention are useful in exploring biological mechanisms in laboratory animals.

The compounds of this invention can be administered in a wide variety of oral or parenteral unit dosage forms, singly, or in admixture with other active compounds.

The present invention also includes the process of bringing the compounds thereof into a form suitable for therapeutic administration by associating them with liquid or solid, pharmaceutically acceptable carriers.

Various changes and modifications of this invention can be made by those skilled in the art to which it relates and to the extent that such variations incorporate the spirit of the invention, they are included in the scope of the claims.

What is claimed is:
1. A compound of the formula:

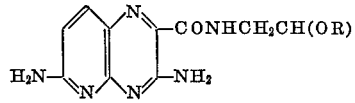

wherein R represents a lower alkyl group.
2. 3,6 - diamino - N-(2,2-diethoxyethyl)pyrido[2,3-b] pyrazine-2-carboxamide.

References Cited by the Examiner

Osdene et al.: J. Chem. Soc., London (1955), pages 2027–31.

NICHOLAS S. RIZZO, *Primary Examiner.*